United States Patent [19]

Kakefuda

[11] Patent Number: 5,386,498
[45] Date of Patent: Jan. 31, 1995

[54] EXPERT SYSTEM HAVING A KNOWLEDGE BASE COMPILER AND A CERTAINTY FACTOR MANAGER

[75] Inventor: Hideaki Kakefuda, Tokyo, Japan

[73] Assignee: Kabushiki Kaisha Toshiba, Kawasaki, Japan

[21] Appl. No.: 799,959

[22] Filed: Nov. 29, 1991

[30] Foreign Application Priority Data

Nov. 30, 1990 [JP] Japan ................................. 2-340391

[51] Int. Cl.$^6$ ............................................. G06F 15/00
[52] U.S. Cl. ......................................... 395/75; 395/61
[58] Field of Search ..................... 395/50, 51, 61, 75

[56] References Cited

U.S. PATENT DOCUMENTS

| | | | |
|---|---|---|---|
| 4,860,214 | 8/1989 | Matsuda et al. | 364/513 |
| 5,022,498 | 6/1991 | Sasaki et al. | 187/127 |
| 5,179,634 | 1/1993 | Matsunaga et al. | 395/75 |

OTHER PUBLICATIONS

Parsaye et al., Expert Systems for Experts, John Wiley & Sons, Inc., 1988, 1, 211-215, 223-229, 251.
Fu, Li-Min, "Refinement of Medical Knowledge Bases: A Neural Network Approach," Proc. 3rd Annual IEEE Symposium on Computer-Based Medical Systems, Jun. 1990, 290-297.
Online AI Station for A CIE Integrated Control System; H. Kakefuda et al pp. 51-53; 1989.
Expert system for Instrumentation and Control of Process; K. Matsuo et al. pp. 387-390; 1987.
Implementation of Real-Time expert system for plant Operation; H. Kakefuda et al., Sep. 1990.

Primary Examiner—Robert W. Downs
Attorney, Agent, or Firm—Oblon, Spivak, McClelland, Maier, & Neustadt

[57] ABSTRACT

An expert system which has a plurality of knowledge modules 2 for expressing knowledge of a human expert and having a function for managing the knowledge. The knowledge base modules 2 include a plurality of knowledge respectively and a certainty factor is determined for the knowledge respectively. There is a knowledge base compiler 3 for managing the knowledge base modules 2, extracting a plurality of necessary knowledge base modules from a plurality of the knowledge base modules 2 during execution of an inference process and synthesizing synthesis knowledge base as one knowledge base by synthesizing the extracted knowledge base modules. There is a CF manager 4 for matching a certainty factor determined to the extracted knowledge base modules respectively by the knowledge base compiler 3. To determine a certainty factor unified in the synthesis knowledge base, an inference engine 5 for executing an inference process on data input from external sources by using the synthesis knowledge base having the determined certainty factor, thereby obtains an inference result.

3 Claims, 6 Drawing Sheets

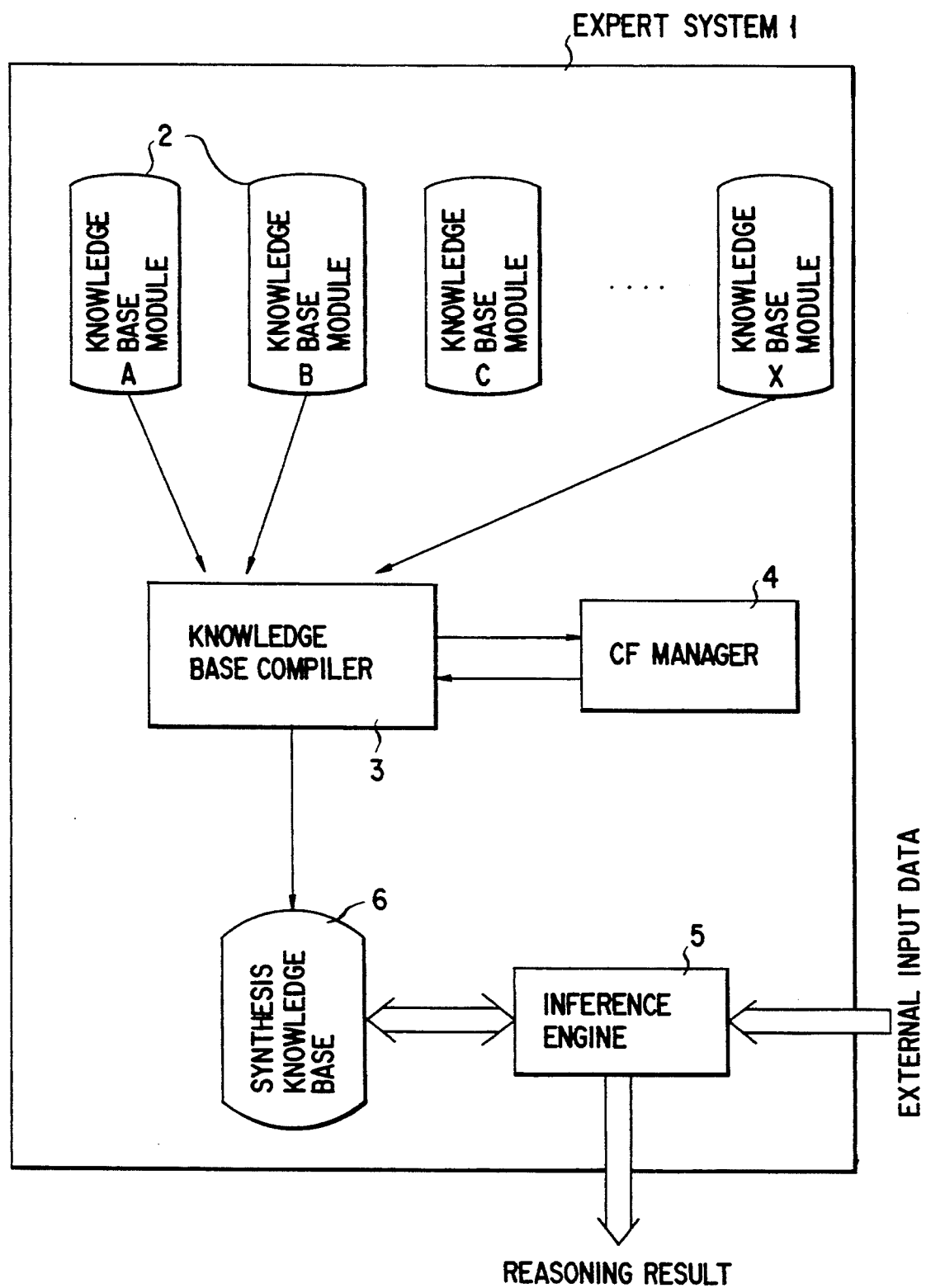
F I G. 1

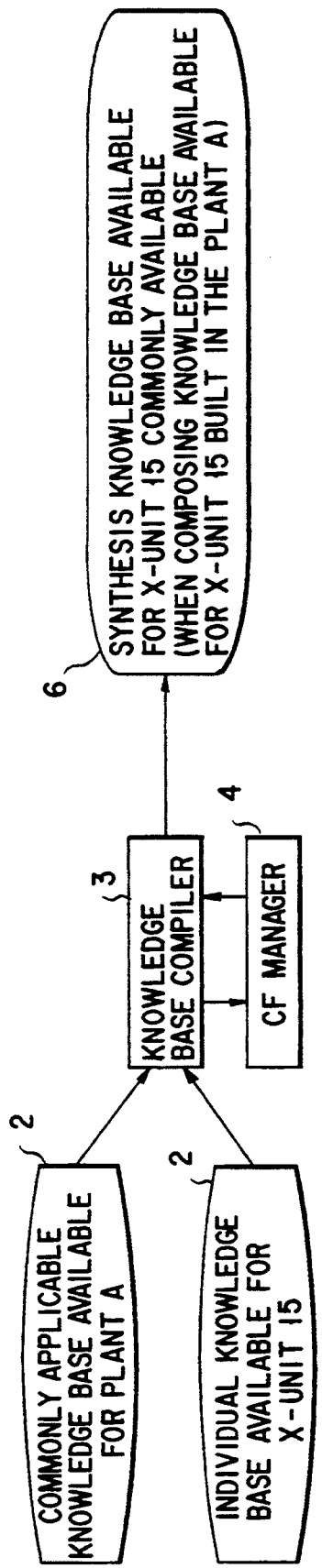
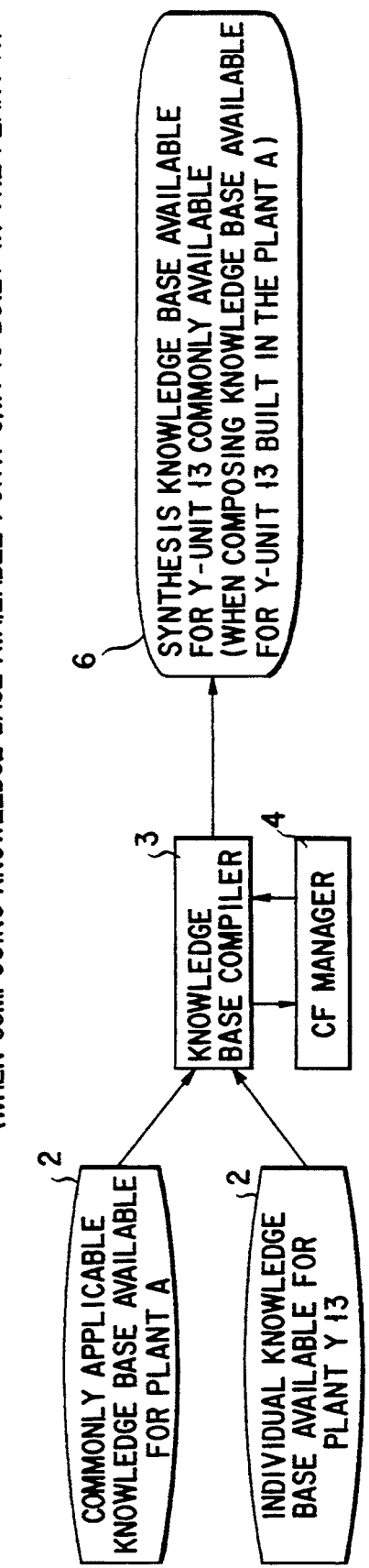
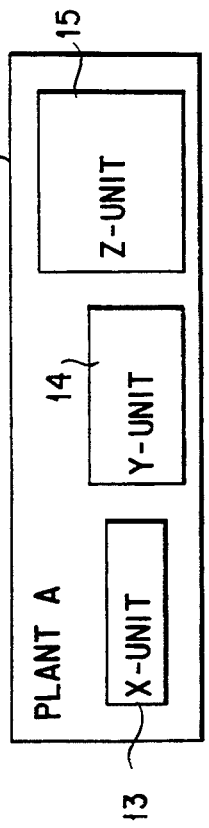
F I G. 6A
F I G. 6B

EXPERT SYSTEM HAVING A KNOWLEDGE BASE COMPILER AND A CERTAINTY FACTOR MANAGER

BACKGROUND OF THE INVENTION

1. Field of the Invention

The present invention relates to an expert system which has a knowledge base and an inference unit, executing an inference process with the inference unit by using knowledge stored in the knowledge base to obtain the inference result, and more particularly, effectively building up a knowledge base to automatically verify a knowledge and tune a certainty factor.

2. Description of the Related Art

Recently, thanks to advanced studies in artificial intelligence, a so-called expert system has been developed, which draws a conclusion from experience and provides practical insight of one skilled in the art, by using a computer. The system has been applied to a wide variety of industrial fields.

Synthesis of knowledge base is important in realizing an expert system for achieving specific objects in some industrial field. In particular, to use tools for building up an expert system, such as an expert shell capable of easily realizing the expert system, the main work is to collect knowledge and to prepare knowledge bases. It takes extremely long time to prepare knowledge bases.

To build an expert system for other similar objects in some industrial field knowledge is classified into two categories. One is knowledge common in the industrial fields (i.e., general knowledge on physical laws and principles). The other knowledge is only applicable to specific objects of the fields (i.e., knowledge applied to objects in the fields, or knowledge related to characteristic and rated). These two kinds of knowledge are generated, managed, and executed in one knowledge base paradigm.

To build up an expert system to deal with other similar objects in the same industrial field, referring to former knowledge base, design staff may use those former knowledge bases as fragmental knowledge. However, even though they may extract available knowledge, it is very difficult to apply former knowledge with no change to an expert system which development is required. Therefore, the design staff need to pick up an available knowledge, one by one, from the knowledge base of the former expert system, and to build up new knowledge bases by the selected knowledge again. Enormous time is required to compose knowledge, verify the knowledge, and tune certainty factor.

As described above, in a conventional expert system, not only a knowledge base cannot be built effectively, but also enormous time is needed to perform the verification of knowledge and the tuning of certainty factor.

SUMMARY OF THE INVENTION

The object of the invention is to provide an extremely reliable expert system which can effectively build up knowledge bases, and can automatically verify each knowledge base and achieve tune of certainty factor.

According to the invention, there is provided an expert system of the invention which includes a knowledge base having a function capable of representing and managing knowledge of human experts and an inference engine having a function executing an inference process by knowledge stored in a knowledge base, wherein the expert system executes an inference process by using knowledge stored in a knowledge base consisting of external input data, to obtain an inference result. The expert system is characterized by comprising a synthesis knowledge base synthesizing unit for managing a plurality of knowledge bases, for extracting necessary knowledge base modules from the knowledge bases during the inference process, and for synthesizing a synthesis knowledge base to be used as one knowledge base, and a certainty factor determination unit for matching determined values of certainty factors of a plurality of knowledge bases respectively extracted by the synthesis knowledge base synthesizing unit, and for determining a uniform certainty factor in the synthesis knowledge base.

Since the expert system of the invention comprises not only an inference engine, but also a synthesis knowledge base synthesizing unit, and a certainty factor determination unit, which perform the above-mentioned functions, the system is advantageous in the following respects:

1) Once a knowledge base is synthesized, the expert system can classify and register a knowledge base module which can be used in other expert systems and knowledge bases which are characteristic in the expert system;
2) When an inference process is executed, the synthesis knowledge base including a plurality of knowledge base modules operates as one knowledge base with logically no inconsistency;
3) The knowledge base module which can be used in other expert system can be portable in the expert system without change.

As a result, to build many similar expert systems for attaining different objects in the same industrial field, a knowledge base can be synthesized by classifying common knowledge base module and an individual knowledge base module, and can be used many times by synthesizing a common part of a knowledge base. Therefore, a knowledge base can be prepared with high efficiency.

Furthermore, since the certainty factor determination unit determines a uniform certainty factor of the synthesized synthesis knowledge base, the expert system of the invention can automatically verify knowledge and tune a certainty factor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows the block diagram of one embodiment of the expert system according to the invention;

FIGS. 6A and 6B show the block diagram of the expert system specifically explaining considerable effect of the expert system according to the invention.

DETAILED DESCRIPTION OF THE PREFERRED EMBODIMENTS

Figure 2:
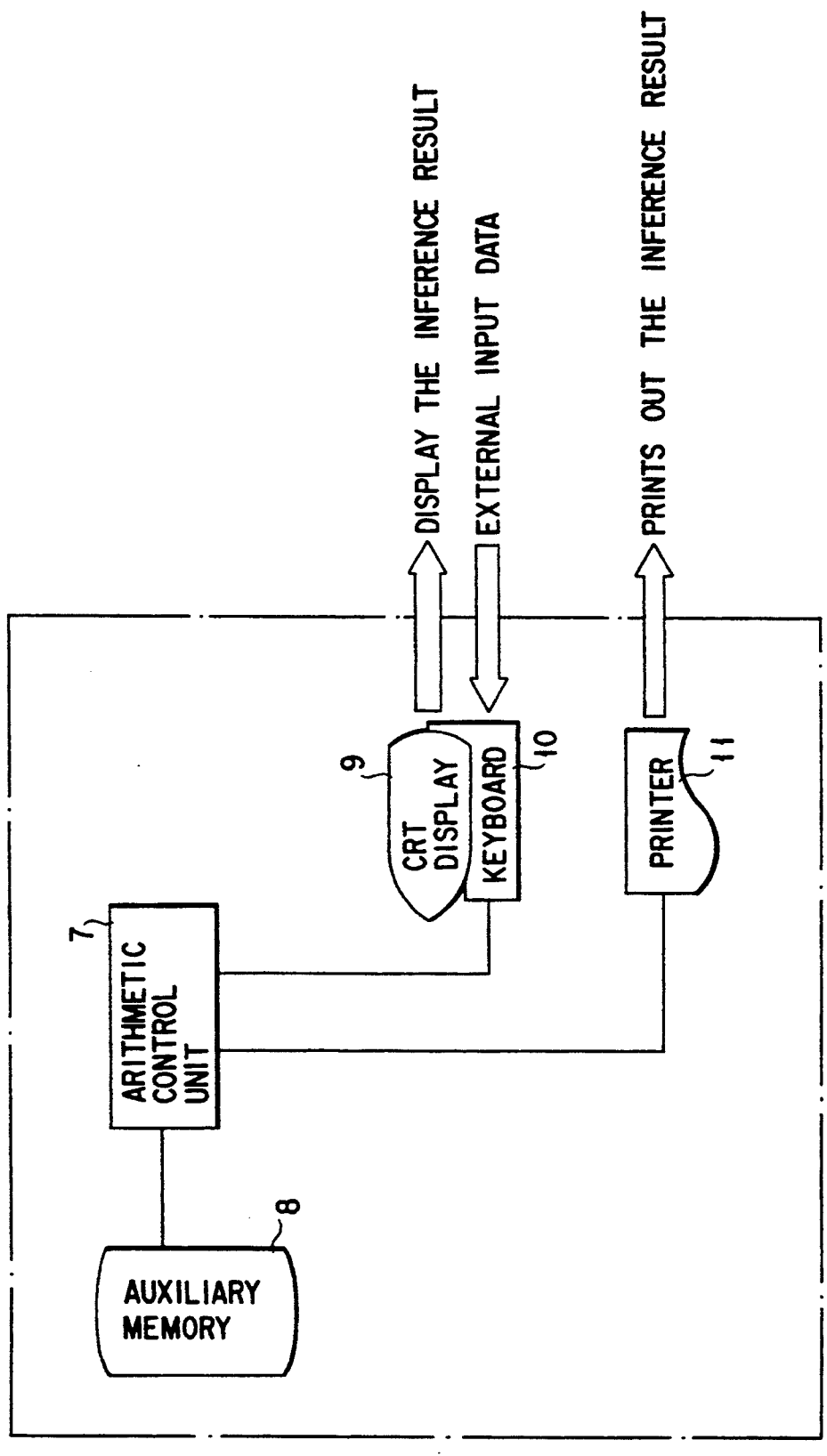
FIG. 2 shows the block diagram of a computer system incorporating the expert system of FIG. 1.

Referring now by accompanying drawings, one embodiment of the expert system according to the invention is described below.

FIG. 1 shows the block diagram of the expert system according to the invention.

As shown in FIG. 1, an expert system 1 of this embodiment is constructed by a plurality of knowledge base modules 2, a knowledge base (KB) compiler 3 being a synthesis knowledge base synthesizing unit, a certainty factor manager (referred to as CF manger hereinafter) 4 for determining a certainty factor, and an inference engine 5 performing inference. In addition, the expert system 1 contains a synthesis knowledge base 6 for storing one knowledge base of a specific object. The term "certainty factor" is determined as the numerically expression of authenticity for production rules and facts.

The knowledge base modules 2 have items of knowledge, which a human expert has acquired and which can be processed on the expert system. The knowledge base compiler 3 manages the knowledge base modules 2, extracts any necessary knowledge base module 2 during an inference process, and synthesizes a synthesis knowledge base 6. The CF manager 4 matches the certainty factors of a plurality of different knowledge base modules 2 extracted by the knowledge base compiler 3, and determines a uniform certainty factor of the synthesis knowledge base 6. The inference engine 5 executes an inference process by processing externally input, data and obtains the inference result.

FIG. 2 shows the block diagram of a computer system incorporating the expert system 1 shown in FIG. 1. In FIG. 2, an arithmetic control unit 7 operates as knowledge base compiler 3, CF manager 4, and inference engine 5. An auxiliary memory 8 stores the knowledge base modules 2 and the synthesis knowledge base 6. A keyboard 10 is used for registering and modifying a knowledge base, instructing an operation of the knowledge base compiler 3, and inputs a data during the inference process or the like. A CRT display device 9 displays information in the expert system 1 as a man-machine interface and the inference result. A printer 1 prints out the inference result.

An operation of the CF manager of the expert system of the embodiment described above will be explained below.

As described above, the CF manager 4 matches the certainty factors of a plurality of different knowledge base modules 2 extracted by the knowledge base compiler 3, and determines a uniform certainty factor for the synthesis knowledge base 6. If a certainty factor (to be described "CF value" hereinafter) determined to facts or production rules stored in each knowledge base module 2 are uneven per knowledge base module 2, matching per knowledge base cannot be achieved. Therefore, a suited uniform CF value, useful as synthesis knowledge base, is calculated while maintaining relativity of the CF values in each knowledge base module 2 by the CF manager 4. In addition, the CF manager 4 also calculates the threshold value (cut off value) which is a basis for deciding whether or not the production rules should be executed (fired) as a uniform threshold value of the synthesis knowledge base 6.

Referring now to flowcharts of FIGS. 3 to 5, detail explanation of steps of processes in the CF manager 4 will be described below.

Figure 3:
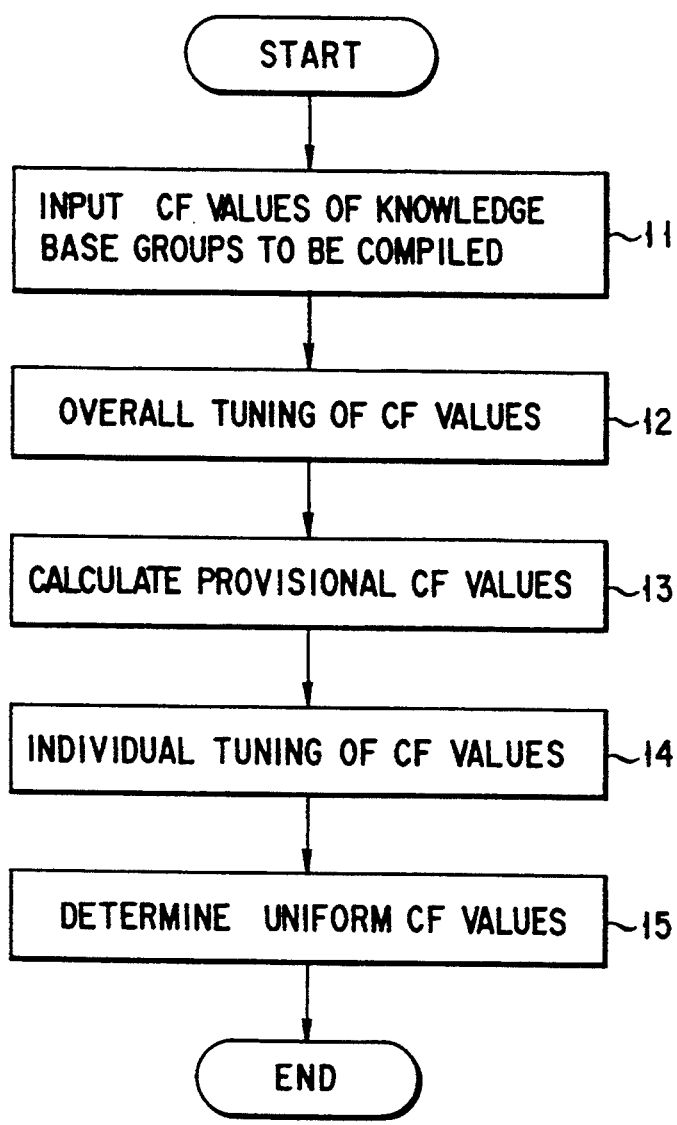
FIG. 3 shows the flowchart explaining a function of the CF (Certainty Factor) manager of the expert system shown in FIG. 1.

FIG. 3 shows the flowchart of process flow of the CF manager 4.

First, the CF manager 4 extracts CF values from each of knowledge base modules 2 input to the knowledge base compiler 3 (step 11). Next, the CF manager 4 performs a tuning of CF values among each knowledge base module 2, i.e. overall tuning (step 12), and calculates provisional CF values (step 13). In these steps, difference between the basis of CF values of all the knowledge base modules 2 is leveled off.

Next, if there were the same facts and production rules in the knowledge base modules 2, the CF manager 4 extracts these from the knowledge base modules 2. And, if different provisional CF values among different knowledge base modules 2 are assigned, the CF manager 4 unifies CF values to same CF values for the same facts and production rules (steps 14 and 15). By the above steps, a uniform CF value for synthesis knowledge base 6 is determined.

Figure 4:
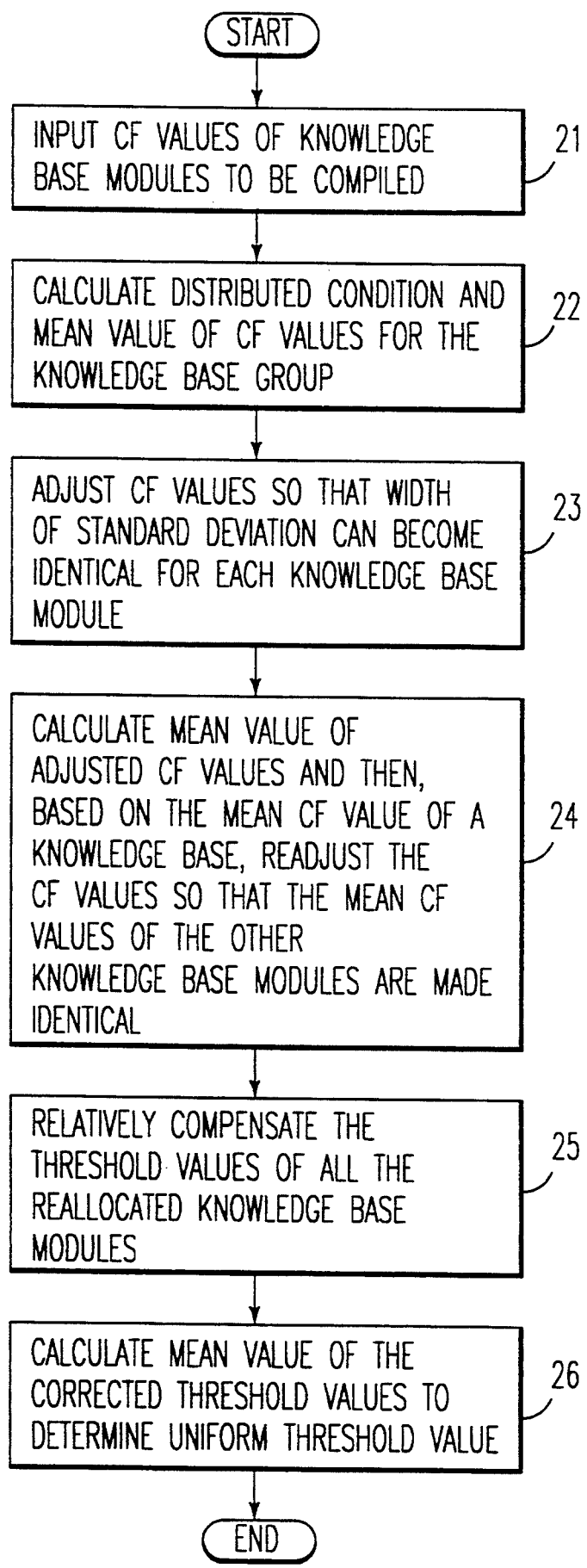
FIG. 4 shows the flowchart explaining a detail overall tuning process of CF values shown in FIG. 3.

FIG. 4 shows the flowchart of the detail process flow of the overall tuning of the CF values of FIG. 3.

First, the CF values of each knowledge base module 2 input to the knowledge base compiler 3 are input to the CF manager 4 (step 21). Next, to confirm the distribution of the CF values of each knowledge stored in the knowledge base modules 2, mean values and standard deviations for the knowledge base module 2 are obtained (step 22).

To unify the distribution width of the CF values assigned to each knowledge base module 2 stored in the synthesis knowledge base 6, the CF values stored in each module 2 are adjusted so that the standard deviations of each knowledge base module 2 are identical and equal to a standard deviation of one specific knowledge base module in step 23. The standard deviations will be used to define the common standard deviation for synthesis knowledge base 6. The standard deviation of one specific knowledge module 2 is used as the standard deviation to which the standard deviations of all of the other knowledge modules are equal. By this step, the distributions of the CF values in each knowledge module 2 become identical.

By step 23, although the distribution states of the calculated CF values stored in each knowledge base module 2 become the same, a decision basis for determining CF values in each knowledge base module 2 is different. Therefore, to level the mean values of the CF values of all knowledge base modules 2, by performing a horizontal displacement of the (shift) CF values in the knowledge base modules 2 without changing the distribution state (standard deviation) of the CF values, the CF values are readjusted (step 24). In this step, an average value of mean values of the CF values in each knowledge base modules 2, or a mean value of the CF values stored in some specific knowledge base module 2 is used as a basis mean value. After the threshold values of the CF values determined for each knowledge base module are changed according to the horizontal displacement (shift) of the CF values (step 25), a threshold value (cut off value) which is a basis whether a rule is executed (fired) or not, is determined to a uniform threshold value by calculating mean values (step 26).

Figure 5:
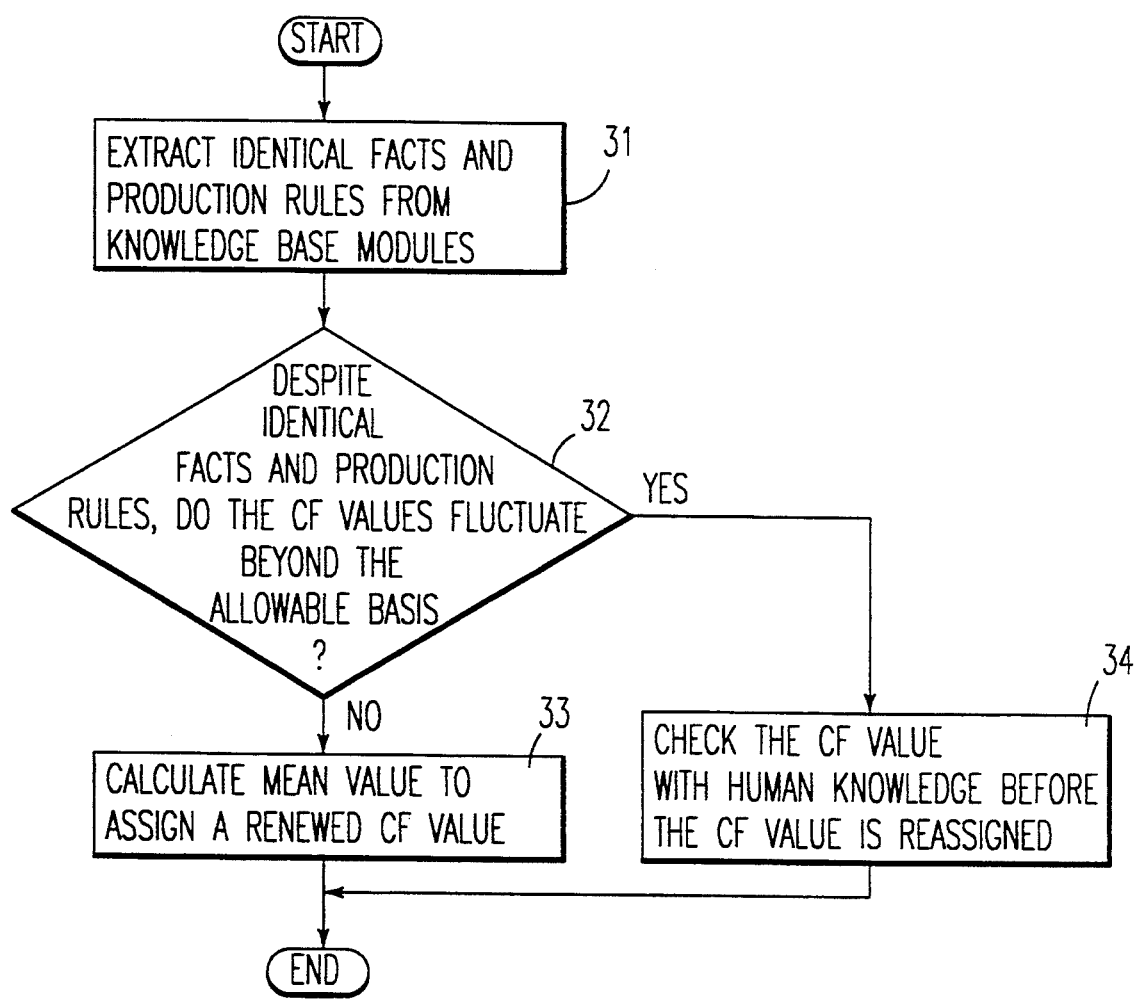
FIG. 5 shows the flowchart explaining a detail individual tuning process of CF values shown in FIG. 3.

FIG. 5 shows the flowchart of a detail flow of function of individual tuning process of the CF value of FIG. 3.

The facts and the production rules, which are commonly applied to the different knowledge base modules 2, are extracted and examined to determine the provisional CF values of the modules 2, which have been calculated in the overall tuning (step 31). Next, whether or not the differences among those provisional CF values are allowable, is checked (step 32). If differences exist, contradiction arises in one knowledge base. The differences have to be resolved in order to perform proper inference. In this step, if the differences are allowable, a mean value of different values is calculated, and is used as a uniform CF value (step 33). If the differences are beyond the allowance, since it is necessary to recondition the knowledge base itself, the CF value is to be reset by the human expert (step 34).

As described above, the expert system 1 of the embodiment comprises a knowledge base compiler 3 for managing the knowledge base modules 2, for extracting any necessary knowledge base module 2, and for generating a synthesis knowledge base 6 as one knowledge base to specific objects, and a CF manager 4 for determining a uniform CF value of the generated synthesis knowledge base 6. Therefore, once a knowledge base is generated, knowledge base modules 2 which can be used in other expert systems, and the specific knowledge base modules 2 of the expert system of the invention can be classified and registered. In addition, since the synthesis knowledge base 6 synthesized from a plurality of knowledge base modules 2 can operate as one knowledge base with no logical contradiction during an inference process, knowledge base modules, which can be used in other knowledge bases, are portable.

Therefore, to develop many similar expert systems for achieving different objects in the same field, the expert system of the invention can synthesize a knowledge base by classifying common knowledge base modules and individual knowledge base modules. Once composed, the common knowledge base modules can be used many times. Therefore, extremely effective knowledge base generation can be accomplished. In addition, the expert system comprises a CF manager for determining the uniform CF value of the generated synthesis knowledge base 6. Therefore, verifying a knowledge and tuning of certainty factors can be automatically performed within a short time.

Knowledge bases can be divided and managed, and the knowledge base compiler 3 can easily synthesize a knowledge base for a required expert system. Since the CF manager 4 can achieve matching of the CF values of the different knowledge base modules 2, extremely effective knowledge base generation can be performed.

FIGS. 6A and 6B show the block diagrams for explaining a distinct effect of the expert system in detail.

In FIG. 6B, a plant A-12 is constructed by X-unit 13, Y-unit 14, and Z-unit 15. To introduce an expert system to each of these units, the expert system of X-unit is developed initially. As shown in FIG. 6A, first a knowledge base of the expert system of X-unit 13 is generated by classifying common knowledge of plant A-12 and specific knowledge of X-unit 13. Thereafter, the knowledge base compiler 3 and the CF manager 4 generate synthesis knowledge base 6 for X-unit 13 in plant A-12.

Next, to build a knowledge base of an expert system of Y-unit 14, the common knowledge base module of plant A is used as common knowledge of plant A-12, thereby generating only specific knowledge base modules for Y-unit 14, and the knowledge base compiler 3 processes these knowledge base modules, thus generating a synthesis knowledge base 6 for Y-unit 14 in plant A-12. The same process as is applied to Y-unit 14, is performed, thereby synthesizing a knowledge base 6 for Z-unit 15.

As described above, to develop a plurality of expert systems for different objects in some specific field, the expert system of the invention can generate and manage a knowledge base for each of the expert systems. Therefore, since the knowledge base modules, which can re-used, are divided and managed, they are referred to and used by the knowledge base compiler 3 to develop an expert system. As a result, a knowledge base can be built up with extremely high efficiency.

The present invention is not limited to the above embodiments and may be practiced or embodied in still other ways without departing from the spirit or the essential character thereof.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An expert system comprising:
a plurality of knowledge base modules (2) for expressing a knowledge of a human expert and having a function for managing said knowledge, each of said knowledge base modules (2) including a plurality of knowledge, a corresponding plurality of certainty factors, a plurality of facts, and a plurality of production rules;
a knowledge base compiler (3) for managing said knowledge base modules (2), extracting a plurality of necessary knowledge base modules from a plurality of said knowledge base modules (2) during execution of an inference process, and synthesizing a new unit of synthesis knowledge base by synthesizing said extracted knowledge base modules;
a CF manager (4) for matching certainty factors of said extracted knowledge base modules, and for determining a uniform certainty factor of said synthesis knowledge base;
an inference engine (5) for inputting data from external sources, and for executing an inference process based on said inputted data and said synthesis knowledge base, to obtain an inference result;
wherein said CF manager (4) includes:
means for inputting certainty factors of a plurality of said extracted knowledge base modules;
overall tuning means for performing a tuning of said certainty factors corresponding to said knowledge base modules;
means for calculating provisional certainty factors for said knowledge base modules tuned by the overall tuning means;

individual tuning means for matching said provisional certainty factors among said knowledge base modules; and means for determining a uniform certainty factor in said synthesis knowledge base matched by said individual tuning means.

2. An expert system according to claim 1, wherein said overall tuning means includes means for calculating distribution states and means values of certainty factors per each knowledge base module (2), and for adjusting certainty factors of said each knowledge base module in said knowledge base modules (2) to unify said distribution states and said mean values among said knowledge base modules.

3. An expert system according to claim 1, wherein said individual tuning means includes means for extracting knowledge of same facts and production rules between said knowledge base modules (2), and for setting new certainty factors, if said certainty factors are different for said same facts and production rules.

* * * * *